(12) United States Patent
Beall et al.

(10) Patent No.: US 10,370,304 B2
(45) Date of Patent: Aug. 6, 2019

(54) FUSED SILICA BASED CELLULAR STRUCTURES

(71) Applicant: Corning Incorporated, Corning, NY (US)

(72) Inventors: Douglas Munroe Beall, Painted Post, NY (US); Cameron Wayne Tanner, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/073,020

(22) Filed: Nov. 6, 2013

(65) Prior Publication Data

US 2014/0147664 A1    May 29, 2014

Related U.S. Application Data

(60) Provisional application No. 61/731,168, filed on Nov. 29, 2012.

(51) Int. Cl.
| | |
|---|---|
| *C03C 11/00* | (2006.01) |
| *C04B 38/06* | (2006.01) |
| *C04B 38/00* | (2006.01) |
| *C03B 19/06* | (2006.01) |
| *C03B 19/08* | (2006.01) |
| *B01D 39/20* | (2006.01) |
| *B01D 69/10* | (2006.01) |

(52) U.S. Cl.
CPC ...... *C04B 38/0635* (2013.01); *B01D 39/2003* (2013.01); *C03B 19/066* (2013.01); *C03B 19/08* (2013.01); *C03C 11/007* (2013.01); *C04B 38/0006* (2013.01); *C04B 38/0009* (2013.01); *B01D 69/10* (2013.01); *Y10T 428/1234* (2015.01); *Y10T 428/24149* (2015.01); *Y10T 428/24157* (2015.01)

(58) Field of Classification Search
CPC ............. C04B 38/0006; C04B 38/0009; Y10T 428/24149; Y10T 428/24157
See application file for complete search history.

(56) References Cited

U.S. PATENT DOCUMENTS

| | | | |
|---|---|---|---|
| 2,047,457 A | 6/1936 | Benner et al. | 106/6 |
| 2,310,432 A | 2/1943 | Haux et al. | 49/77 |

(Continued)

FOREIGN PATENT DOCUMENTS

| | | |
|---|---|---|
| CN | 1838983 A | 9/2006 |
| DE | 3009600 | 9/1981 |

(Continued)

OTHER PUBLICATIONS

Cranswick, L; "Hints on Phase Identification Using Powder X-Ray Diffraction", 1999, p. 1-31; Accessed at http://www.ccp14.ac.uk/poster-talks/phase-id-1999/html/phaseid.htm.*

(Continued)

*Primary Examiner* — Mark Ruthkosky
*Assistant Examiner* — Julia L Rummel

(57) ABSTRACT

A porous cellular body comprising primarily a porous sintered glass material is disclosed. The porous sintered glass material primarily includes a first phase and a second phase, the first phase primarily comprising amorphous fused silica and the second phase comprising amorphous fused silica and a sintering aid.

17 Claims, 4 Drawing Sheets

(56) References Cited

U.S. PATENT DOCUMENTS

| | | | |
|---|---|---|---|
| 3,432,580 A | | 3/1969 | Heidrich et al. .............. 264/43 |
| 3,488,723 A | * | 1/1970 | Veazie ................. C04B 33/13 |
| | | | 181/294 |
| 3,804,647 A | | 4/1974 | Elmer et al. |
| 3,943,994 A | | 3/1976 | Cleveland .................... 165/10 |
| 3,949,030 A | | 4/1976 | Murata ......................... 264/43 |
| 4,093,771 A | | 6/1978 | Goldstein et al. ............ 428/312 |
| 4,568,273 A | * | 2/1986 | Narumiya ............ C04B 38/0051 |
| | | | 110/216 |
| 4,617,060 A | | 10/1986 | Dreibelbis ................ 106/193 R |
| 6,548,142 B1 | | 4/2003 | Kar et al. ..................... 428/116 |
| 6,699,808 B1 | | 3/2004 | Schwertfeger et al. ........ 501/20 |
| 6,762,061 B1 | * | 7/2004 | Borrelli ................ B01J 19/0046 |
| | | | 101/327 |
| 6,773,481 B2 | | 8/2004 | Noguchi et al. |
| 7,550,025 B2 | | 6/2009 | Fukuda et al. |
| 7,744,669 B2 | | 6/2010 | Paisley et al. |
| 2002/0061811 A1 | * | 5/2002 | Merkel ........................ 501/106 |
| 2006/0251909 A1 | * | 11/2006 | Beall ........................ B32B 1/08 |
| | | | 428/454 |
| 2008/0063833 A1 | * | 3/2008 | Beall .................... C04B 35/185 |
| | | | 428/116 |
| 2008/0286179 A1 | * | 11/2008 | Liu .................... B01D 39/2086 |
| | | | 422/310 |
| 2010/0044911 A1 | * | 2/2010 | Suwabe ................ C04B 35/478 |
| | | | 264/211.11 |
| 2010/0304965 A1 | * | 12/2010 | Boek ....................... B01D 53/88 |
| | | | 502/344 |
| 2011/0129784 A1 | * | 6/2011 | Bange et al. ................. 432/265 |
| 2011/0135873 A1 | * | 6/2011 | Okazaki ............... C04B 35/195 |
| | | | 428/116 |
| 2011/0262690 A1 | * | 10/2011 | Bayer .......................... 428/116 |
| 2011/0314821 A1 | * | 12/2011 | Bookbinder ........... B01D 53/02 |
| | | | 60/694 |
| 2012/0098169 A1 | * | 4/2012 | Kumar et al. ................. 264/654 |

FOREIGN PATENT DOCUMENTS

| | | | |
|---|---|---|---|
| DE | 4440104 | | 5/1995 |
| DE | 10262015 | | 7/2004 |
| JP | 4866584 A | | 4/1974 |
| JP | 5860666 A | | 4/1983 |
| JP | 7330376 A | | 12/1995 |
| JP | 11060330 A | * | 3/1999 |
| JP | 2010142704 A | | 7/2010 |
| JP | 2013039543 A | | 2/2013 |
| KR | 20110132281 A | * | 10/2011 |
| WO | 2013154499 A1 | | 10/2013 |

OTHER PUBLICATIONS

Merriam-Webster Dictionary entry for "Cellular", p. 1-3; Accessed on Oct. 22, 2015 at http://www.merriam-webster.com/dictionary/cellular.*

Mehrotra, P. "1.07 Powder Processing and Green Shaping: 1.07.5 Powder Mixing and Particle Size Reduction" from "Comprehensive Hard Materials" Ed. Sarin, V., vol. 1; 2014; p. 220.*

Perna, I.; "Materials for Geopolymers", p. 1-15; Accessed on Feb. 7, 2017 at https://www.irsm.cas.cz/materialy/oddeleni/1/prezentace/Materials_for_geopolymer.pdf.*

Xu, H. "Geopolymerization of Aluminosilicates", 2002, p. i-ii; Accessed on Feb. 7, 2017 at http://www.cc.ntut.edu.tw/~twcheng/01_Front.pdf.*

English language translation of JP 11-60330 A generated on Sep. 6, 2017 with AIPN Japanese Patent Office Website (https://dossier1.j-platpat.inpit.go.jp/tri/all/odse/ODSE_GM101_Top.action).*

Narula, C.; Allison, J.; Bauer, D.; Gandhi, H.; "Materials Chemistry Issues Related to Advanced Materials Applications in the Automotive Industry", .; 1996; vol. 8, p. 984-1003.*

DE10262015—machine translation.

DE4440104—machine translation.

DE3009600—machine translation.

Chinese First Office Action CN201380071635.4 dated Oct. 10, 2016, China Patent Office, 19 Pgs.

International Search Report and Written Opinion PCT/US2013/072254 dated Feb. 25, 2014.

Leiser, "Short-Term Stability of High-Silica Glasses",Ceramic Enginnering and Science Proceedings, Jan. 18-22, 1981, p. 809-813.

EP13808375.3 Examination Report dated Jan. 12, 2017, Euorpean Patent Office.

* cited by examiner

FUSED SILICA BASED CELLULAR STRUCTURES

This application claims the benefit of priority under 35 U.S.C. § 119 of U.S. Provisional Application Ser. No. 61/731,168 filed on Nov. 29, 2012, the content of which is relied upon and incorporated herein by reference in its entirety.

BACKGROUND

The disclosure relates generally to porous cellular structures and more particularly to fused silica based porous cellular structures.

Demand and consumption of fossil fuels whether it be for transportation, manufacturing activities, or generation of electricity is growing steadily worldwide. The increasing demand outstrips supply and drives up cost of energy, and the emissions from combustion of fossil fuel degrade the environment and adversely affect human health. In the short term, nitric oxide, nitrous oxide, hydrocarbons, carbon monoxide, and soot drive the formation of smog and acid rain. Longer term, the otherwise inert carbon dioxide associated with burning of a carbon-based fuel accelerates global warming. In response, governments around the world are imposing ever tighter regulations on acceptable levels of pollutants. The measures being implemented control mobile and stationary sources of emissions from industrial to commercial and consumer activities.

In the transportation industry, regulations and fuel costs have fostered the development of more fuel efficient and cleaner engines, as well as more capable aftertreatment systems. Acceptable levels of NOx and soot (PM) originating from diesel and gasoline powered engines have been reduced numerous times over the past two decades in North America and Europe for light and heavy duty vehicle classes. Regulations not too different from these are being considered for phased implementation in China, India, Russia, and Brazil. The favored aftertreatment system for use with diesel engines includes a diesel oxidation catalyst (DOC), a soot filter, and a system for selective catalytic reduction (SCR) of $NO_x$. These systems are just now being implemented on a massive scale. Each component utilizes a cellular ceramic either as a catalyst support or as the basis of the filtering structure.

The cellular ceramic substrates that support the SCR and DOC catalysts were originally developed in the 1970's to use as the catalytic converter for treatment of exhaust gases from gasoline powered passenger cars. The environment in the exhaust system of a gasoline powered vehicle from that era was especially severe. Cordierite became the preferred material to perform in this environment as it withstands extremely high temperatures that can melt most materials, severe thermal shock conditions associated with initial start-up of a vehicle, and transitions between heavy to low load conditions that will cause cracking in most materials. It can also tolerate fuel containing high concentrations of sulfur.

The situation some thirty years later looks quite different. Rapid responding sensors and control systems allow vehicles to automatically self-adjust and respond when malfunctions do occur to prevent damage. Temperature excursions that would cause melting are rare in the aftertreatment system of gasoline powered vehicles. Temperatures in diesel exhaust systems are also much lower than those in gasoline. The maximum temperature is no higher and likely much less than 1100° C. Fuel sulfur concentrations have been reduced from more than 500 ppm to less than 50 ppm to enhance catalyst lifetime and reduce acid rain. The requirements that the substrate and filter materials are resist attack by acid condensates such as from oxides of sulfur are not as severe.

The process for manufacture of cordierite substrates and filters is energy intensive and the source of greenhouse gas emissions. Temperatures of more than 1400° C. are used to drive reactive sintering to form cordierite. The firing process is also time consuming. This is because the heating cycles are slow to limit strains due to thermal gradients and shrinkage mismatches are required to prevent cracking. For all of these reasons, there is an opportunity for new materials that can be manufactured in a less energy intensive way to be used as catalyst supports in diesel and gasoline aftertreatment systems. Furthermore, such cellular substrates can also find application as membrane supports for chemical separations, filtration of water streams to purify water or separate desired chemical or biological products in industrial scale processes.

SUMMARY

One embodiment of the disclosure relates to a porous cellular body. The porous cellular body primarily includes a porous sintered glass material. The porous sintered glass material primarily includes a first phase and a second phase, the first phase primarily including amorphous fused silica and the second phase including amorphous fused silica and a sintering aid material.

Another embodiment of the disclosure relates to a method of making a porous cellular body. The method includes compounding a plurality of batch constituents to form a precursor batch composition. The batch constituents include amorphous fused silica and a sintering aid. The method also includes extruding the precursor batch composition to form a cellular green body. In addition, the method includes subjecting the cellular green body to a heat treatment to make a porous cellular body, the porous cellular body comprising primarily a porous sintered glass material. The porous sintered glass material comprises at least one phase that primarily comprises amorphous fused silica.

Yet another embodiment of the disclosure relates to a porous cellular body made by a process that includes compounding a plurality of batch constituents to form a precursor batch composition. The batch constituents include amorphous fused silica and a sintering aid. The process also includes extruding the precursor batch composition to form a cellular green body. In addition, the process includes subjecting the cellular green body to a heat treatment to make a porous cellular body, the porous cellular body comprising primarily a porous sintered glass material. The porous sintered glass material comprises at least one phase that primarily comprises amorphous fused silica.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or

DETAILED DESCRIPTION

Figure 1:
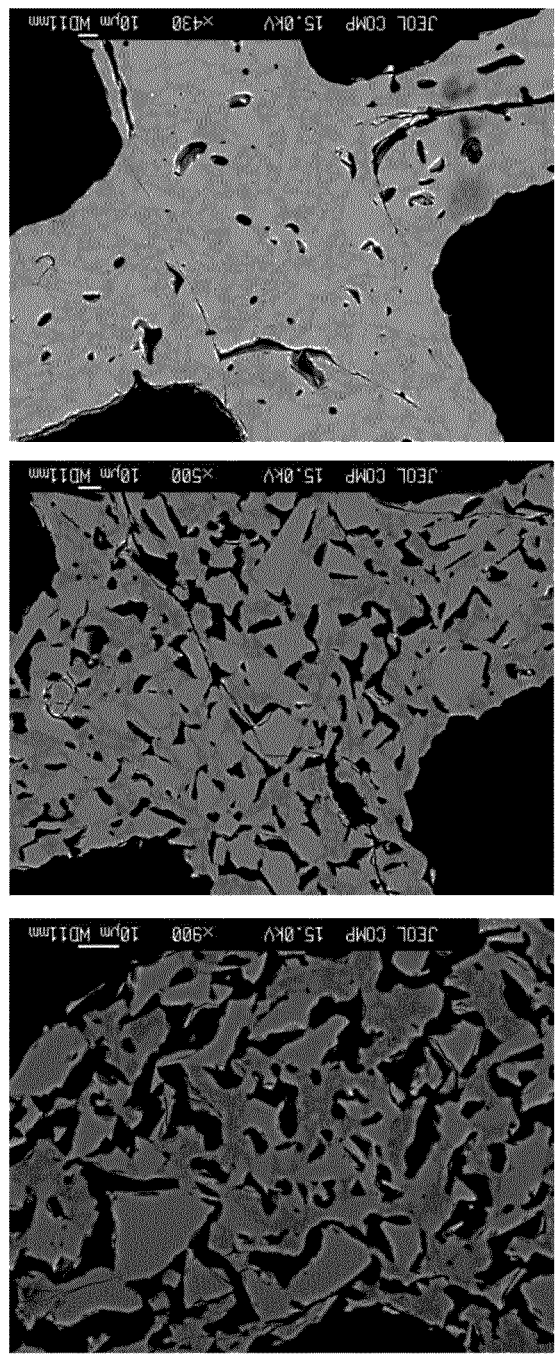
FIGS. 1A-1C show SEM micrograph images of three samples made according to embodiments disclosed herein.

Various embodiments of the disclosure will be described in detail with reference to the drawings, if any.

As used herein, the term "primary" or "primarily" means that a stated material makes up the majority (i.e., greater than 50%) of the material in a recited body, phase, or structure. For example, when a cellular body comprises primarily a porous sintered glass material, the porous sintered glass material makes up a majority (i.e., greater than 50% by weight) of the material in the body. By further way of example, when a phase comprises primarily amorphous fused silica, the amorphous fused silica makes up a majority (i.e., greater than 50% by weight) of the material in that phase. The weight percentage of a material can, for example, be determined by SEM image analysis according to methods known to persons skilled in the art.

As used herein, the term "sintering aid" refers to a material that can facilitate sintering of amorphous materials that are intended to remain amorphous following sintering by reducing their tendency toward devitrification at elevated temperatures (e.g., greater than 1,000° C.) as well as to lower their glass transition temperature. Examples of sintering aids include boron containing compounds, such as $B_2O_3$ and $H_3BO_3$, alkali feldspars, such as potassium feldspar, as well as alkaline earth carbonates, such as strontium carbonate, calcium carbonate, and magnesium carbonate. Examples of sintering aids may also include magnesium oxide, magnesium hydroxide, and talc.

As used herein, the term "sintering aid material" refers to a material that is present in a sintering aid (e.g., $B_2O_3$), such as when the sintering aid is added as a component to a precursor batch composition, and remains in a sintered material made from the precursor batch composition.

Embodiments disclosed herein include those in which a porous sintered glass material makes up at least 60% by weight, and further such as at least 70% by weight, and still further such as at least 80% by weight, and still yet further such as at least 90% by weight, and even still yet further such as at least 95%, by weight, of the material in the cellular body, including essentially all of the material in the cellular body.

Embodiments disclosed herein include those in which amorphous fused silica makes up at least 50% by weight, such as at least 60% by weight, and further such as at least 70% by weight, and still further such as at least 80% by weight, and still yet further such as at least 90% by weight, and even still yet further such as at least 95% by weight of the material in the cellular body.

Embodiments disclosed herein also include those in which the cellular body consists essentially of a porous sintered glass material.

The porous sintered glass material primarily includes a first phase and a second phase, the first phase primarily including amorphous fused silica and the second phase including amorphous fused silica and a sintering aid material.

For example, embodiments disclosed herein include those in which the porous sintered glass material consists essentially of the first phase and the second phase. Embodiments disclosed herein also include those in which essentially all of the porous sintered glass material is comprised of the first phase and the second phase.

In certain exemplary embodiments, the first phase comprises a higher weight percentage of amorphous fused silica than the second phase. For example, in certain exemplary embodiments, the first phase comprises at least 97% by weight of amorphous fused silica and the second phase comprises amorphous fused silica and at least 6% by weight of a sintering aid material. The first phase and the second phase collectively comprise at least 85% by weight of amorphous fused silica.

For example, in an exemplary embodiment, the first phase comprises at least 98% by weight of amorphous fused silica, such as at least 99% by weight of amorphous fused silica, and further such as at least 99.5% by weight of amorphous fused silica, including from 97% to 99.9% by weight of amorphous fused silica.

In an exemplary embodiment, the second phase comprises less than 92% by weight of amorphous fused silica, such as less than 85% by weight of amorphous fused silica, and further such as less than 78% by weight of amorphous fused silica, including from 50% to 92% by weight of amorphous fused silica, and further including from 65% to 85% by weight of amorphous fused silica.

In an exemplary embodiment, the first phase and the second phase collectively comprise at least 88% by weight of amorphous fused silica, including at least 90% by weight of amorphous fused silica, further including at least 92% by weight of amorphous fused silica, and yet further including at least 94% by weight of amorphous fused silica, and still yet further including at least 96% by weight of amorphous fused silica, and even still yet further including at least 98% by weight of amorphous fused silica.

In exemplary embodiments, the first phase is a major phase and the second phase is a minor phase, meaning the weight ratio of the first phase to the second phase is greater than 1:1, such as at least 1.5:1, and further such as at least 2:1, and still yet further such as at least 2.5:1, and even still yet further such as at least 3:1.

In certain exemplary embodiments, the first phase comprises from 60% to 90% by weight of the porous sintered glass material and the second phase comprises from 10% to 40% by weight of the porous sintered glass material, such as embodiments in which the first phase comprises from 65% to 85% by weight of the porous sintered glass material and the second phase comprises from 15% to 35% by weight of the porous sintered glass material, and further such as embodiments in which the first phase comprises from 70% to 80% by weight of the porous sintered glass material and the second phase comprises from 20% to 30% by weight of the porous sintered glass material.

In certain exemplary embodiments, the majority of sintering aid material is in the second phase. This enables the second phase to have a lower glass transition temperature than the first phase and allows the second phase to fuse particles of the first phase together during heat treatment to provide strength. Examples of sintering aid materials that may be present in the second phase include boron, strontium, calcium, silicon, and magnesium.

In certain exemplary embodiments, the second phase may contain at least 10% by weight of sintering aid material, such as at least 15% by weight of sintering aid material, including from 10% to 25% by weight of sintering aid material and further including from 15% to 20% by weight of sintering aid material. In certain exemplary embodiments, the first phase may contain less than 3% by weight of sintering aid material, such as less than 2% by weight of sintering aid material, including from 0.1% to 3% by weight of sintering aid material and further including from 0.5% to 2% by weight of sintering aid material.

The use of certain materials as sintering aids facilitate bonding between particles and reduces the tendency toward devitrification of fused silica. Fused silica at the elevated temperatures (e.g., greater than 1,000° C.) required for sintering easily crystallizes to cristobalite or other crystalline silica. Crystallization can have two possibly detrimental effects on properties of the cellular body. Crystalline silicas have higher thermal expansion coefficients than fused silica and raise the thermal expansion coefficient of the cellular body. Cracking can occur due to mismatch of thermal expansion coefficient between the crystalline phase and fused silica on cooling from the sintering temperature. Formation of microcracks lowers strength.

The use of a sintering aid helps to overcome these difficulties. The sintering aid delays the process of crystallization so as to allow the fused silica cellular body to be sintered. It induces formation of a secondary amorphous phase that is still primarily fused silica. Areas of fused silica that dissolve sintering aid have a lower glass transition temperature and hence a lower viscosity. The lower viscosity enables bonding between particles to build strength and maintain low thermal expansion coefficient.

The amount of sintering aid should not be too high. Excessive sintering aid can by itself increase the thermal expansion coefficient. It can also lower the glass transition temperature to a point where the cellular structure cannot operate at temperatures of an aftertreatment system.

The use of the two phase microstructure allows the overall dopant (e.g., sintering aid) level of the porous sintered glass material to remain low enough to retain low coefficient of thermal expansion (CTE) of the composite while providing a mechanism for sintering and porosity retention at suitable heat treatment temperatures, such as temperatures between about 1,100° C. and 1,200° C.

In certain exemplary embodiments, the porous sintered glass material has a total porosity of at least 20%, such as at least 25%, and further such as at least 30%, and still further such as at least 35%, and still yet further such as at least 40%, and even still yet further such as at least 45%, including at least 50%. For example, the porous sintered glass material may, in exemplary embodiments, have a total porosity of from 20% to 60%, including from 25% to 55%, and further including from 30% to 50%.

In certain exemplary embodiments, the porous sintered glass material has a median pore diameter ($d_{50}$) of at least 0.5 microns, such as at least 0.75 microns, and further such as at least 1 micron, and yet further such as at least 1.5 microns, and still yet further such as at least 2 microns, and even still yet further such as at least 4 microns. For example, the porous sintered glass material, may have a median pore diameter ($d_{50}$) of from 0.5 microns to 10 microns, such as from 1 micron to 5 microns.

In certain exemplary embodiments, the porous cellular body has a CTE (25-800° C.) of less than $8.0 \times 10^{-7}$/° C., such as less than $7.0 \times 10^{-7}$/° C., and further such as less than $6.0 \times 10^{-7}$/° C., and yet further such as less than $5.0 \times 10^{-7}$/° C., and still yet further such as less than $4.0 \times 10^{-7}$/° C., including from $2.0 \times 10^{-7}$/° C. to $8.0 \times 10^{-7}$/° C., and further including from $3.0 \times 10^{-7}$/° C. to $7.0 \times 10^{-7}$/° C.

In certain exemplary embodiments, the porous cellular body has a modulus of rupture (MOR) based on the four point bend test of at least 1,000 psi, such as at least 2,000 psi, and further such as at least 3,000 psi, and yet further such as at least 4,000 psi, and still yet further such as at least 5,000 psi, including from 1,000 psi to 8,000 psi, and further including from 2,000 psi to 6,000 psi.

In certain exemplary embodiments, the porous sintered glass material comprises little to no sodium. For example, in certain exemplary embodiments, the porous sintered glass material comprises less than 0.1% by weight of sodium, such as less than 0.1% by weight of $Na_2O$. In certain exemplary embodiments, the porous sintered glass material is essentially free of sodium, such as being essentially free of $Na_2O$.

In certain exemplary embodiments, the porous sintered glass material comprises only minor amounts of cristobalite, including little to no cristobalite. For example, in certain exemplary embodiments, the porous sintered glass material comprises less than 10% by weight of cristobalite, such as less than 5% by weight of cristobalite, and further such as less than 2% by weight of cristobalite, and yet further such as less than 1% by weight of cristobalite, including being essentially free of cristobalite.

Embodiments herein include a method of making a porous cellular body. The method includes compounding a plurality of batch constituents to form a precursor batch composition. The batch constituents include amorphous fused silica. The batch constituents also include a sintering aid.

The amorphous fused silica can include fused silica powder, such as ground fused silica powder having a median particle size of from 0.5 to 200 microns, such as from 1 to 100 microns, and further such as from 2 to 50 microns, and yet further such as from 5 to 20 microns. Examples of amorphous fused silica that can be used in the precursor batch composition include Teco-sil® fused silica powders, such as Teco-sil® 325, available from C-E Minerals.

The sintering aid can be selected from at least one of the group consisting of boron containing compounds, such as $B_2O_3$, alkali feldspars, such as potassium feldspar, as well as alkaline earth carbonates, such as strontium carbonate, calcium carbonate, and magnesium carbonate, magnesium oxide and hydroxide, and talc. In exemplary embodiments, the sintering aid can have a median particle size of less than 10 microns, such as from 1 to 8 microns, and further such as from 2 to 6 microns.

The amorphous fused silica can comprise at least 70% by weight of the dry, inorganic batch constituents, such as at least 75% by weight of the dry, inorganic batch constituents, and further such as at least 80% by weight of the dry, inorganic batch constituents, and still further such as at least 85% by weight of the dry, inorganic batch constituents, and still yet further such as at least 90% by weight of the dry inorganic batch constituents, and even still yet further such as at least 95% by weight of the dry, inorganic batch components, such as from 70% to 99% by weight of the dry, inorganic batch components.

In certain exemplary embodiments, the amorphous fused silica can comprise at least 90% by weight of the silica containing components of the batch such as at least 95% by weight of the silica containing components of the batch and further such as at least 99% by weight of the silica containing components of the batch, including essentially all of the silica containing components of the batch.

In certain exemplary embodiments, the sintering aid can comprise at least 1% by weight of the precursor batch composition, such as at least 2% by weight of the precursor batch composition, and further such as at least 5% by weight of the precursor batch composition, such as from 1% to 10% by weight of the precursor batch composition and further such as from 2% to 8% by weight of the precursor batch composition.

Other batch constituents may also be added to facilitate heat treatment and/or sintering, such as constituents that may act to reduce shrinkage during heat treatment or help extend devitrification resistance. Examples of such constituents include alumina and aluminum hydroxide, such as high purity, highly dispersible alumina powders manufactured under the trade name Dispal®, available from Sasol. Such constituents may, for example, be added as precursor batch components in an amount ranging from 1% to 10% by weight, such as from 2% to 8% by weight, based on the weight of the dry, inorganic batch constituents.

In addition, constituents such as lubricants, binders (organic and/or inorganic), and pore formers may be added as batch constituents. Examples of lubricants include oils, including light mineral oils as well as vegetable oils including corn oil, high molecular weight polybutenes, polyol esters, and polyalpha olefins, such as Durasyn® polyalpha olefins available from INEOS Oligomers. Lubricants may also include liquid rosins, such as tall oil, and may also include fatty acids and/or fatty acid salts such as metallic stearates, such as Liga. In certain exemplary embodiments, lubricants may be added as precursor batch components in an amount ranging from 1% to 10% by weight, such as from 2% to 8% by weight on a weight percent by super addition basis.

Examples of organic binders include cellulose ethers, such as Methocel™ cellulose ethers available from the Dow Chemical Company. Examples of inorganic binders include colloidal silicas, such as Ludox® colloidal silicas available from W.R. Grace & Co. In certain exemplary embodiments, binders may be added as precursor batch components in an amount ranging from 1% to 15% by weight, such as from 2% to 10% by weight on a weight percent by super addition basis.

Other silica sources, such as Cab-o-sil fumed silica available from Cabot Corporation, silica soot (such as that formed as a bi-product of optical wave guide manufacturing), and silicic acids may be also added in minor amounts as extrusion aids and/or sintering aids.

Examples of pore formers include organic materials such as starches. Pore formers may also include materials mainly comprised of elemental carbon, such as graphite, amorphous carbon, and carbon black. Examples of starch-based pore formers include pea starch, corn starch, wheat starch, and potato starch. In certain exemplary embodiments, pore formers may be added as precursor batch components in an amount of at least 5% by weight, such as at least 10% by weight, and further such as at least 15% by weight, and still further such as at least 20% by weight on a weight percent by super addition basis, including from 5% to 50% by weight, and further including from 10% to 40% by weight, and still further such as from 15% to 35% by weight, and still yet further such as from 20% to 30% by weight on a weight percent by super addition basis.

In certain exemplary embodiments, the batch constituents contain less than 1% by weight of silica soot, such as embodiments in which the batch is essentially free of silica soot.

The ingredients may be mixed, for example, in a muller or plow blade mixer. A solvent may be added in an amount that is less than is needed to plasticize the batch. With water as the solvent, the water hydrates the binder and the powder particles. One or more lubricants, if desired, may then be added to the mix to wet out the binder and powder particles.

The precursor batch may then be plasticized by shearing the wet mix formed above in any suitable mixer in which the batch will be plasticized, such as, but not limited to, a twin-screw extruder/mixer, auger mixer, muller mixer, or double arm, etc. Extent of plasticization is dependent on the concentration of the components (e.g., binder, solvent, lubricant and the inorganics), temperature of the components, the amount of work put in to the batch, the shear rate, and extrusion velocity.

In a further step, the composition may be extruded to form a cellular green body. Extrusion may be done with devices that provide low to moderate shear. For example hydraulic ram extrusion press or two stage de-airing single auger are low shear devices. A single screw extruder is a moderate shear device. The extrusion may be vertical or horizontal.

It will be appreciated that cellular bodies disclosed herein may have any convenient size and shape and the disclosed embodiments are applicable to all processes in which plastic powder mixtures are shaped. The process may be especially suited to production of cellular monolith bodies such as honeycombs. Cellular bodies find use in a number of applications such as catalytic, adsorption, electrically heated catalysts, filters such as diesel particulate filters, molten metal filters, regenerator cores, etc.

Generally cellular body densities range from about 235 cells/cm$^2$ (1500 cells/in$^2$) to about 15 cells/cm$^2$ (100 cells/in$^2$). Examples of cellular bodies produced by embodiments herein, may include those having about 94 cells/cm$^2$ (about 600 cells/in$^2$), or about 62 cells/cm$^2$ (about 400 cells/in$^2$) each having wall thicknesses of about 0.1 mm (4 mils). Typical wall thicknesses may be from about 0.07 to about 0.6 mm (about 3 to about 25 mils), including from about 0.18 to 0.33 mm (about 7 to about 13 mils), although thicknesses of about 0.02-0.048 mm (1-2 mils) are also possible. Methods disclosed herein may be especially suited for extruding thin wall/high cell density cellular bodies.

The extrudates may then be dried, using, for example, microwave and/or hot air convective drying equipment, and subjected to additional heat treatment in order to make a porous cellular body comprising primarily a porous sintered glass material.

The heat treatment should be carried out under a duration and temperature profile that is sufficient to result in adequate sintering while at the same time not being of such long duration and/or under such excessive temperatures that a cellular body having undesired final properties (e.g., strength, CTE) results.

In certain exemplary embodiments, the heat treatment is a single heat treatment having a total duration of less than 20 hours, such as a total duration of less than 15 hours, and further such as a total duration of less than 10 hours, and yet further such as a total duration of less than 5 hours, including a total duration of from 2 to 20 hours and further including a total duration of 5 to 15 hours.

In certain exemplary embodiments, the top heat treatment temperature (i.e., the top temperature to which the bodies are exposed, sometimes referred to as the "top soak" temperature) is less than 1250° C., such as less than 1225° C., and further such as less than 1200° C., and still further such as less than 1175° C., and still yet further such as less than 1150° C., including from 1000° C. to 1250° C., such as from 1050° C. to 1225° C., and further such as from 1100° C. to 1200° C.

In certain exemplary embodiments, the duration of exposure of the bodies to a temperature within 50° C. of the top heat treatment temperature is less than 5 hours, such as less than 4 hours, and further such as less than 3 hours, and still yet further such as less than 2 hours, such as from 30 minutes to 5 hours and further such as from 1 hour to 3 hours.

In certain exemplary embodiments, the heat treatment comprises heating up the body to the top heat treatment temperature at a rate of at least 50° C. per hour, such as from 50° C. to 500° C. per hour, and further such as from 75° C. to 350° C. per hour, and yet further such as from 100° C. to 250° C. per hour for at least 2 hours and less than 20 hours, such as for at least 4 hours and less than 18 hours, and further such as at least 5 hours and less than 15 hours.

Cellular bodies of various sizes can be made using embodiments disclosed herein. For example, in certain exemplary embodiments, porous cellular bodies having diameters of greater than 5 inches and lengths greater than 7 inches, such as diameters greater than 7 inches and lengths greater than 10 inches, and further such as cellular bodies having diameters greater than 10 inches and lengths greater than 14 inches, such as diameters of from 5 inches to 15 inches and lengths of from 7 inches to 20 inches, can be made using a total heat treatment time of 20 hours or less.

The disclosure and scope of the appended claims will be further clarified by the following examples.

EXAMPLES

Following are six tables of examples of compositions and physical properties. All the samples were prepared by dry mixing of inorganic powders with binders, lubricants, and in some cases, pore formers, to form precursor batch compositions. The compositions listed in Table 1 were formed into cellular bodies using a twin-screw mixer in line with a die. The cell density and wall thickness of the cellular bodies were about 600/in² and 100 μm, respectively.

The compositions listed in Tables 2-6 were blended in a Littleford mixer. Following that, the powder mixture was placed in a muller and water added. When the mixture attained the consistency of small crumbs, the mixture was transferred to the barrel of a ram extruder and extruded through a die containing ¼ inch diameter holes in order to plasticize the material. Following this, the "spaghetti" was reloaded into the extruder barrel and extruded again through a honeycomb die of either 200 cells per sq. in. (cpsi) and 8 mil webs, or 400 cpsi and 6 mil webs. Following the extrusion process, the water was removed in a microwave dryer, and the parts were heat treated in a gas-fired kiln to temperatures between 1050° C. and 1200° C. and for times between about 2 and 4 hours (shown in tables). The parts were then cooled and measured for CTE, strength (4-point bend MOR), elastic modulus, porosity (Hg porosimetry) and dimensions. CTE, MOR, and porosity characteristics were determined using methods corresponding to ASTM E228, C1674-08, and D4284-07, respectively.

TABLE 1

| Composition information and other characteristics | Comparative Example 1 | Example 1 | Example 2 |
|---|---|---|---|
| Fused Silica, TecoSil 325 mesh (wt %) | 100 | 94 | 88 |
| Silica, Cabosil (wt %) | — | — | 6 |
| Boric acid (wt %) | — | 6 | 6 |
| Hydroxypropylmethocellulose, Methocel ™ F240 LF (wt % super add) | 10 | 10 | 10 |
| Fatty Acid, Tall Oil L-5 (wt % super add) | — | — | — |
| Polyalphaolefin, Durasyn ® 162 (wt % super add) | — | — | — |
| Oleic Acid, Olean White (wt % super add) | 2 | 2 | 2 |
| Top heat treatment temperature (° C.) | 1225 | 1125 | 1125 |
| Porosity by Image Analysis (%) | 29 | — | 37 |
| CTE on heating from 25° C. to 800° C. ($\times 10^{-7}$/° C.) | 11.6 | 5 | 5 |
| MOR (psi) | Weak | Strong | 1480 |

Table 2 shows compositions and properties for parts made from Tecosil fused silica 44css (from CE-Minerals Corp) and Boric acid (12-Mule Team) in levels from 0-7%. The boric acid was milled to a median particle diameter of about 5 microns in order to get it well dispersed within the green parts. Each composition contained about 6% super-addition of F240 Methocel™. Various lubricants were also added as shown (D-162, Liga or Tall oil). Firing temperatures and times are listed for each condition. The first two compositions shown are comparative compositions containing fused silica extruded with either D-162 or Tall oil lubricant and fired to 1100-1150° C. It can be seen that these compositions show low strength after firing due to lack of sintering aid. However, addition of boric acid at all levels results in high strength, low CTE, and high porosity (with the exception of Examples 14 and 15, where it is believed that a high level of sodium in the Liga lubricant resulted in a high level of cristobalite in the body, leading to substantially higher CTE).

TABLE 2

| Composition information and other characteristics | Comparative Example 2 | Comparative Example 3 | Comparative Example 4 | Comparative Example 5 | Example 3 |
|---|---|---|---|---|---|
| Fused Silica, TecoSil 325 (wt %) | 100.0 | 100.0 | 100.0 | 100.0 | 97.5 |
| Boric acid (wt %) | — | — | — | — | 2.5 |
| Methocel ™ F240 LF (wt % super add) | 6 | 6 | 6 | 6 | 6 |
| Liga (wt % super add) | — | — | — | — | — |
| Tall Oil (wt % super add) | 5 | 5 | — | — | 5 |

TABLE 2-continued

| Composition information and other characteristics | | | | | |
|---|---|---|---|---|---|
| Durasyn ® 162 (wt % super add) | — | — | 1 | 1 | — |
| Water (wt % super add) | 20 | 20 | 24 | 24 | 21 |
| Total heat treatment time (hours) | 4 | 4 | 4 | 4 | 4 |
| Top heat treatment temperature (° C.) | 1150 | 1100 | 1100 | 1150 | 1100 |
| CTE on heating from 25° C. to 800° C. ($\times 10^{-7}$/° C.) | 2.4 | 3.4 | 2.2 | 2.1 | 3.7 |
| CTE on heating from 25° C. to 200° C. ($\times 10^{-7}$/° C.) | 4.5 | 4.1 | 3.2 | 4.1 | 6.5 |
| MOR fired bars (psi) | 183.9 | 60.0 | 59.7 | 198.9 | 1000.6 |
| MOR honeycomb (psi) | 683 | 267 | 220 | 778 | 4172 |
| Axial E-mod at 25° C. (psi $\times 10^5$) | 1.90 | NA | NA | 2.05 | 5.74 |
| Strain tolerance (%) | 0.10 | NA | NA | 0.10 | 0.17 |
| % Porosity (mercury porosimetry) | 33.1 | 37.1 | 34.5 | 33.9 | 32.4 |
| Median pore size ($d_{50}$) | 0.53 | 0.49 | 0.47 | 0.52 | 0.97 |
| Cells per square inch | 380 | 364 | 367 | 373 | 412 |
| Web thickness (mils) | 7.45 | 6.26 | 7.63 | 7.10 | 6.31 |
| Average channel width (inches) | 0.042 | 0.042 | 0.041 | 0.044 | 0.040 |
| Closed frontal area | 0.27 | 0.22 | 0.27 | 0.26 | 0.24 |

| Composition information and other characteristics | Example 4 | Example 5 | Example 6 | Example 7 | Example 8 |
|---|---|---|---|---|---|
| Fused Silica, TecoSil 325 (wt %) | 97.5 | 96.8 | 96.8 | 96.8 | 96.0 |
| Boric acid (wt %) | 2.5 | 3.2 | 3.2 | 3.2 | 4.0 |
| Methocel ™ F240 LF (wt % super add) | 6 | 6 | 6 | 6 | 6 |
| Liga (wt % super add) | — | — | — | — | — |
| Tall Oil (wt % super add) | 5 | 5 | 5 | 5 | 5 |
| Durasyn ® 162 (wt % super add) | — | — | — | — | — |
| Water (wt % super add) | 21 | 21 | 21 | 21 | 21 |
| Total heat treatment time (hours) | 4 | 4 | 4 | 4 | 4 |
| Top heat treatment temperature (° C.) | 1150 | 1100 | 1150 | 1050 | 1150 |
| CTE on heating from 25° C. to 800° C. ($\times 10^{-7}$/° C.) | 3.1 | 4.1 | 5.7 | 3.7 | 3.7 |
| CTE on heating from 25° C. to 200° C. ($\times 10^{-7}$/° C.) | 4.3 | 6.5 | 9.8 | 5.5 | 8.6 |
| MOR fired bars (psi) | 1514 | 1217 | 1235 | 899 | 1353 |
| MOR honeycomb (psi) | 6166 | 3708 | 5196 | NA | 5204 |
| Axial E-mod at 25° C. (psi $\times 10^5$) | 8.49 | 6.04 | 9.63 | 4.93 | 12.4 |
| Strain tolerance (%) | 0.18 | 0.20 | 0.13 | 0.18 | 0.11 |
| % Porosity (mercury porosimetry) | 29.5 | 29.0 | 29.1 | 34.6 | 26.0 |
| Median pore size ($d_{50}$) | 0.93 | 1.82 | 0.88 | 0.90 | 1.06 |
| Cells per square inch | 240 | 416 | 446 | NA | 409 |
| Web thickness (mils) | 8.48 | 8.84 | 6.01 | NA | 6.91 |
| Average channel width (inches) | 0.052 | 0.037 | 0.038 | NA | 0.039 |
| Closed frontal area | 0.25 | 0.33 | 0.24 | NA | 0.26 |

| Composition information and other characteristics | Example 9 | Example 10 | Example 11 | Example 12 | Example 13 |
|---|---|---|---|---|---|
| Fused Silica, TecoSil 325 (wt %) | 96.0 | 96.0 | 95.0 | 95.0 | 95.0 |
| Boric acid (wt %) | 4.0 | 4.0 | 5.0 | 5.0 | 5.0 |
| Methocel ™ F240 LF (wt % super add) | 6 | 6 | 6 | 6 | 6 |

TABLE 2-continued

| Composition information and other characteristics | | | | | |
|---|---|---|---|---|---|
| Liga (wt % super add) | — | — | — | — | — |
| Tall Oil (wt % super add) | 5 | 5 | — | — | — |
| Durasyn ® 162 (wt % super add) | — | — | 1 | 1 | 1 |
| Water (wt % super add) | 21 | 21 | 25 | 25 | 25 |
| Total heat treatment time (hours) | 4 | 4 | 4 | 4 | 4 |
| Top heat treatment temperature (° C.) | 1100 | 1050 | 1100 | 1150 | 1150 |
| CTE on heating from 25° C. to 800° C. ($\times 10^{-7}$/° C.) | 2.6 | 3.8 | 4.3 | 3.5 | 5.5 |
| CTE on heating from 25° C. to 200° C. ($\times 10^{-7}$/° C.) | 6.0 | NA | 6.3 | 6.7 | 8.8 |
| MOR fired bars (psi) | 1335 | 977 | 1256 | 1357 | 1448 |
| MOR honeycomb (psi) | 4782 | 3401 | 5456 | 5166 | 5719 |
| Axial E-mod at 25° C. (psi $\times 10^5$) | 8.33 | 4.90 | 10.1 | 15.5 | 15.0 |
| Strain tolerance (%) | 0.16 | 0.20 | 0.12 | 0.09 | 0.10 |
| % Porosity (mercury porosimetry) | 35.7 | 31.6 | 26.5 | 24.1 | 25.4 |
| Median pore size ($d_{50}$) | 0.78 | 1.27 | 1.33 | 1.06 | 1.09 |
| Cells per square inch | 414 | 379 | 430 | 421 | 438 |
| Web thickness (mils) | 7.42 | 8.00 | 5.91 | 6.89 | 6.49 |
| Average channel width (inches) | 0.042 | 0.040 | 0.039 | 0.039 | 0.042 |
| Closed frontal area | 0.28 | 0.29 | 0.23 | 0.26 | 0.25 |

| Composition information and other characteristics | Example 14 | Example 15 | Example 16 | Example 17 | Example 18 |
|---|---|---|---|---|---|
| Fused Silica, TecoSil 325 (wt %) | 95.0 | 95.0 | 93.0 | 93.0 | 93.0 |
| Boric acid (wt %) | 5.0 | 5.0 | 7.0 | 7.0 | 7.0 |
| Methocel ™ F240 LF (wt % super add) | — | — | 6 | 6 | 6 |
| Liga (wt % super add) | 1 | 1 | — | — | — |
| Tall Oil (wt % super add) | — | — | 5 | 5 | 5 |
| Durasyn ® 162 (wt % super add) | — | — | — | — | — |
| Water (wt % super add) | 25 | 25 | 21 | 21 | 21 |
| Total heat treatment time (hours $\times 10^5$) | 4 | 4 | 2 | 4 | 2 |
| Top heat treatment temperature (° C.) | 1150 | 1100 | 1100 | 1100 | 1150 |
| CTE on heating from 25° C. to 800° C. ($\times 10^{-7}$/° C.) | 14.2 | 14.1 | 5.2 | 4.1 | 7.8 |
| CTE on heating from 25° C. to 200° C. ($\times 10^{-7}$/° C.) | 42.3 | 34.8 | 6.3 | 7.0 | 7.7 |
| MOR fired bars (psi) | 2164 | 1085 | 1400 | 1179 | 702 |
| MOR honeycomb (psi) | 9815 | 4743 | 5986 | 4348 | 2983 |
| Axial E-mod at 25° C. (psi) | 15.7 | NA | 11.3 | 16.0 | 5.67 |
| Strain tolerance (%) | 0.14 | NA | 0.12 | 0.74 | 0.12 |
| % Porosity (mercury porosimetry) | 20.4 | 27.7 | 25.1 | 27.3 | 28.6 |
| Median pore size ($d_{50}$) | 1.46 | 1.30 | 1.62 | 0.90 | 0.66 |
| Cells per square inch | 455 | 441 | 430 | 416 | 407 |
| Web thickness (mils) | 5.49 | 5.80 | 6.01 | 7.17 | 6.22 |
| Average channel width (inches) | 0.038 | 0.039 | 0.039 | 0.039 | 0.040 |
| Closed frontal area | 0.22 | 0.23 | 0.23 | 0.27 | 0.24 |

Table 3 shows a set of compositions containing Tecosil fused silica, boric acid and either cross-linked pea starch as a pore former, or alumina from Dispal 15N4-80 (AlOOH). Cross-linked pea starch was selected for its high purity (low ash content). All compositions in Table 2 use a 6% F240 methocel and 5% D-162 binder/lubricant package. It can be seen that addition of a pore former results in development of higher porosity as well as somewhat increased median pore diameter compared to the same conditions made without pore former. Use of Dispal helps maintain preferred physical properties and may help to reduce firing shrinkage and help extend devitrification resistance.

TABLE 3

| Composition information and other characteristics | Example 19 | Example 20 | Example 21 | Example 22 | Example 23 |
|---|---|---|---|---|---|
| Dispal 18N4-80 (wt %) | — | — | — | — | — |
| Fused Silica, TecoSil 325 (wt %) | 97.5 | 97.5 | 95.0 | 95.0 | 95.0 |
| Boric acid (wt %) | 2.5 | 2.5 | 5.0 | 5.0 | 5.0 |
| Pea Starch (Esmland CL-9492) (wt % super add) | 20 | 20 | 10 | 10 | 10 |
| Methocel ™ F240 LF (wt % super add) | 6 | 6 | 6 | 6 | 6 |
| Liga (wt % super add) | — | — | — | — | — |
| Tall Oil (wt % super add) | 5 | 5 | 5 | 5 | 5 |
| Durasyn ® 162 (wt % super add) | — | — | — | — | — |
| Water (wt % super add) | 30 | 30 | 26 | 26 | 26 |
| Total heat treatment time (hours) | 4 | 2 | 4 | NA | 2 |
| Top heat treatment temperature (° C.) | 1150 | 1100 | 1100 | NA | 1100 |
| CTE on heating from 25° C. to 800° C. ($\times 10^{-7}$/° C.) | 6.5 | 2.6 | 4.5 | 4.1 | 4.4 |
| CTE on heating from 25° C. to 200° C. ($\times 10^{-7}$/° C.) | 14.6 | 6.2 | 6.6 | 6.4 | 6.4 |
| MOR fired bars (psi) | 795 | 520 | 1309 | 1342 | 1254 |
| MOR honeycomb (psi) | 3731 | 2597 | 5168 | 7090 | 5426 |
| Axial E-mod at 25° C. (psi $\times 10^5$) | 4.71 | 3.02 | 6.98 | 6.20 | 7.20 |
| Strain tolerance (%) | 0.17 | 0.17 | 0.19 | 0.22 | 0.17 |
| % Porosity (mercury porosimetry) | 47.0 | 50.0 | 38.8 | 37.1 | 40.0 |
| Median pore size ($d_{50}$) | 5.30 | 5.05 | 4.63 | 3.40 | 3.69 |
| Cells per square inch | 235 | 229 | 237 | 221 | 239 |
| Web thickness (mils) | 7.36 | 6.98 | 8.83 | 6.70 | 7.96 |
| Average channel width (inches) | 0.055 | 0.056 | 0.053 | 0.060 | 0.053 |
| Closed frontal area | 0.21 | 0.20 | 0.25 | 0.19 | 0.23 |

| Composition information and other characteristics | Example 24 | Example 25 | Example 26 | Example 27 | Example 28 |
|---|---|---|---|---|---|
| Dispal 18N4-80 (wt %) | — | 3.5 | 3.5 | 3.5 | 5.1 |
| Fused Silica, TecoSil 325 (wt %) | 95.0 | 91.5 | 91.5 | 91.5 | 89.9 |
| Boric acid (wt %) | 5.0 | 5.0 | 5.0 | 5.0 | 5.0 |
| Pea Starch (Esmland CL-9492) (wt % super add) | 10 | — | — | — | — |
| Methocel ™ F240 LF (wt % super add) | 6 | 6 | 6 | 6 | 6 |
| Liga (wt % super add) | — | — | — | — | — |
| Tall Oil (wt % super add) | 5 | 5 | 5 | 5 | 5 |
| Durasyn ® 162 (wt % super add) | — | — | — | — | — |
| Water (wt % super add) | 26 | 21 | 21 | 21 | 21 |
| Total heat treatment time (hours) | 4 | 4 | 4 | 4 | 4 |

TABLE 3-continued

| | | | | | |
|---|---|---|---|---|---|
| Top heat treatment temperature (° C.) | 1150 | 1150 | 1050 | 1100 | 1100 |
| CTE on heating from 25° C. to 800° C. (×10$^{-7}$/° C.) | 4.9 | 6.1 | 6.2 | 6.6 | 7.0 |
| CTE on heating from 25° C. to 200° C. (×10$^{-7}$/° C.) | 8.9 | 9.8 | 7.0 | 8.2 | 8.6 |
| MOR fired bars (psi) | 1407 | 998 | 757 | 1075 | 969 |
| MOR honeycomb (psi) | 5421 | 4021 | 2427 | 3882 | 3688 |
| Axial E-mod at 25° C. (psi × 10$^5$) | 10.7 | 13.0 | 5.66 | 9.30 | 9.73 |
| Strain tolerance (%) | 0.13 | 0.08 | 0.13 | 0.12 | 0.10 |
| % Porosity (mercury porosimetry) | 33.8 | 24.3 | 30.5 | 30.9 | 30.2 |
| Median pore size (d$_{50}$) | 5.20 | 1.09 | 1.02 | 0.88 | 0.72 |
| Cells per square inch | 245 | 412 | 393 | 396 | 415 |
| Web thickness (mils) | 8.91 | 6.55 | 8.60 | 7.52 | 6.94 |
| Average channel width (inches) | 0.052 | 0.040 | 0.038 | 0.043 | 0.040 |
| Closed frontal area | 0.26 | 0.25 | 0.31 | 0.28 | 0.26 |

| Composition information and other characteristics | Example 29 | Example 30 | Example 31 | Example 32 | Example 33 | Example 34 |
|---|---|---|---|---|---|---|
| Dispal 18N4-80 (wt %) | 5.1 | 2.5 | 2.5 | 1.5 | 1.5 | 1.5 |
| Fused Silica, TecoSil 325 (wt %) | 89.9 | 92.5 | 92.5 | 95.5 | 95.5 | 95.5 |
| Boric acid (wt %) | 5.0 | 5.0 | 5.0 | 3.0 | 3.0 | 3.0 |
| Pea Starch (Esmland CL-9492) (wt % super add) | — | — | — | — | — | — |
| Methocel ™ F240 LF (wt % super add) | 6 | 6 | 6 | 6 | 6 | 6 |
| Liga (wt % super add) | — | — | — | — | — | — |
| Tall Oil (wt % super add) | 5 | 5 | 5 | 5 | 5 | 5 |
| Durasyn ® 162 (wt % super add) | — | — | — | — | — | — |
| Water (wt % super add) | 21 | 21 | 21 | 21 | 21 | 21 |
| Total heat treatment time (hours) | 2 | 2 | 4 | 4 | 4 | 2 |
| Top heat treatment temperature (° C.) | 1100 | 1100 | 1100 | 1100 | 1150 | 1100 |
| CTE on heating from 25° C. to 800° C. (×10$^{-7}$/° C.) | 6.1 | 6.2 | 5.6 | 5.4 | 6.4 | 5.6 |
| CTE on heating from 25° C. to 200° C. (×10$^{-7}$/° C.) | NA | 8.4 | 7.5 | 8.2 | 11.4 | 7.2 |
| MOR fired bars (psi) | 1080 | 1256 | 1159 | 572 | 659 | 561 |
| MOR honeycomb (psi) | 4494 | 5252 | 4887 | 2196 | 2189 | 2423 |
| Axial E-mod at 25° C. (psi × 10$^5$) | 7.94 | 7.83 | 9.86 | 5.05 | 7.27 | 4.38 |
| Strain tolerance (%) | 0.14 | 0.16 | 0.12 | 0.11 | 0.09 | 0.13 |
| % Porosity (mercury porosimetry) | NA | NA | 27.8 | 31.1 | 30.7 | NA |
| Median pore size (d$_{50}$) | NA | NA | 1.16 | 2.03 | 2.12 | NA |
| Cells per square inch | 403 | 405 | 415 | 379 | 386 | 384 |
| Web thickness (mils) | 6.40 | 6.35 | 6.22 | 7.20 | 8.35 | 6.29 |
| Average channel width (inches) | 0.039 | 0.040 | 0.040 | 0.044 | 0.042 | 0.040 |
| Closed frontal area | 0.24 | 0.24 | 0.24 | 0.26 | 0.30 | 0.23 |

Table 4 shows a set of compositions containing Tecosil fused silica and G-200HP potassium feldspar (Imerys corporation) and some with alumina from Dispal 15N4-80 (AlOOH). It can be seen from the results that potassium feldspar can be an effective sintering aid, but requires close attention to feldspar content, firing time, and firing temperature to develop suitable combinations of strength and porosity.

TABLE 4

| Composition information and other characteristics | Example 35 | Example 36 | Example 37 | Example 38 | Example 39 |
|---|---|---|---|---|---|
| Dispal 15N4 (wt %) | — | — | — | — | 1.5 |
| Potassium feldspar G-200 HP (wt %) | 2.5 | 2.5 | 5.0 | 5.0 | 2.5 |
| Fused Silica, TecoSil GDP/44CSS (wt %) | 97.5 | 97.5 | 95.0 | 95.0 | 96.0 |
| Boric acid (wt %) | — | — | — | — | — |
| Methocel™ F240 LF (wt % super add) | 6 | 6 | 6 | 6 | 6 |
| Liga (wt % super add) | — | — | — | — | — |
| Tall Oil (wt % super add) | — | — | — | — | — |
| Durasyn® 162 (wt % super add) | 5 | 5 | 5 | 5 | 5 |
| Water (wt % super add) | 21 | 21 | 21 | 21 | 21 |
| Total heat treatment time (hours) | 2 | 2 | 2 | 2 | 4 |
| Top heat treatment temperature (°C.) | 1150 | 1100 | 1150 | 1100 | 1050 |
| CTE on heating from 25° C. to 800° C. ($\times 10^{-7}$/° C.) | 4.6 | 4.0 | 5.1 | 3.9 | 1.7 |
| CTE on heating from 25° C. to 200° C. ($\times 10^{-7}$/° C.) | 5.7 | 4.3 | 6.5 | 4.0 | 0.8 |
| MOR fired bars (psi) | 726 | 175 | 1158 | 248 | 43 |
| MOR honeycomb (psi) | 2593 | 650 | 4873 | 925 | NA |
| Axial E-mod at 25° C. (psi × $10^5$) | NA | NA | NA | NA | 4.20 |
| Strain tolerance (%) | NA | NA | NA | NA | 0.01 |
| % Porosity (mercury porosimetry) | 26.7 | 34.1 | 21.8 | 33.4 | 36.1 |
| Median pore size ($d_{50}$) | 0.50 | 1.42 | 0.52 | 1.46 | 0.52 |
| Cells per square inch | 403 | 370 | 427 | 375 | NA |
| Web thickness (mils) | 7.54 | 7.55 | 6.14 | 7.46 | NA |
| Average channel width (inches) | 0.038 | 0.042 | 0.038 | 0.040 | NA |
| Closed frontal area | 0.28 | 0.27 | 0.24 | 0.27 | NA |

| Composition information and other characteristics | Example 40 | Example 41 | Example 42 | Example 43 | Example 44 |
|---|---|---|---|---|---|
| Dispal 15N4 (wt %) | 1.5 | 1.5 | 3.0 | 3.0 | 3.0 |
| Potassium feldspar G-200 HP (wt %) | 2.5 | 2.5 | 5.0 | 5.0 | 5.0 |
| Fused Silica, TecoSil GDP/44CSS (wt %) | 96.0 | 96.0 | 92.0 | 92.0 | 92.0 |
| Boric acid (wt %) | — | — | — | — | — |
| Methocel™ F240 LF (wt % super add) | 6 | 6 | 6 | 6 | 6 |
| Liga (wt % super add) | — | — | — | — | — |
| Tall Oil (wt % super add) | — | — | — | — | — |
| Durasyn® 162 (wt % super add) | 5 | 5 | 5 | 5 | 5 |
| Water (wt % super add) | 21 | 21 | 21 | 21 | 21 |
| Total heat treatment time (hours) | 4 | 4 | 2 | 4 | 2 |
| Top heat treatment temperature (°C.) | 1150 | 1100 | 1150 | 1100 | 1100 |
| CTE on heating from 25° C. to 800° C. ($\times 10^{-7}$/° C.) | 7.0 | 5.2 | 5.2 | 6.8 | 5.2 |
| CTE on heating from 25° C. to 200° C. ($\times 10^{-7}$/° C.) | 10.6 | 4.5 | 8.5 | 6.8 | 1.7 |
| MOR fired bars (psi) | 597 | 152 | 1291 | 666 | 173 |
| MOR honeycomb (psi) | 2523 | 554 | 5379 | 2465 | 699 |
| Axial E-mod at 25° C. (psi × $10^5$) | 4.76 | 1.75 | 14.7 | 6.03 | 1.90 |

TABLE 4-continued

|  |  |  |  |  |  |
|---|---|---|---|---|---|
| Strain tolerance (%) | 0.13 | 0.09 | NA | NA | NA |
| % Porosity (mercury porosimetry) | 29.4 | 36.2 | 17.2 | 27.4 | 33.5 |
| Median pore size ($d_{50}$) | 0.69 | 0.59 | 1.72 | 0.63 | 0.52 |
| Cells per square inch | 408 | 378 | 462 | 397 | 387 |
| Web thickness (mils) | 6.25 | 7.62 | 6.09 | 7.31 | 6.74 |
| Average channel width (inches) | 0.041 | 0.041 | 0.037 | 0.040 | 0.040 |
| Closed frontal area | 0.24 | 0.27 | 0.24 | 0.27 | 0.25 |

Table 5 shows a set of compositions containing Tecosil fused silica, G-200HP potassium feldspar, alumina from Dispal 15N4-80 and various starch materials and/or graphite as pore formers. Suitable combinations of properties can be achieved with high porosity by this method. Some of the conditions show relatively low strength when fired to 1100° C. for 2 hours, but the strength can be increased by longer soak times or higher soak temperatures.

TABLE 5

| Composition information and other characteristics | Example 45 | Example 46 | Example 47 | Example 48 | Example 49 |
|---|---|---|---|---|---|
| Dispal 15N4 (wt %) | 3.0 | 3.0 | 3.5 | 3.5 | 3.5 |
| Potassium feldspar G-200 HP (wt %) | 5.0 | 5.0 | 5.0 | 5.0 | 5.0 |
| Fused Silica, TecoSil GDP/44CSS (wt %) | 92.0 | 92.0 | 91.5 | 91.5 | 91.5 |
| Boric acid (wt %) | — | — | — | — | — |
| Pea starch (Esmland CL-9492) (wt % super add) | — | — | — | — | — |
| Potato starch (Esmland XL) (wt % super add) | 20 | 20 | — | — | — |
| Wheat starch (Fibersym) (wt % super add) | — | — | — | — | — |
| Corn starch (Emsland CL) (wt % super add) | — | — | 20 | 20 | 20 |
| Ashbury graphite (wt % super add) | — | — | — | — | — |
| Methocel ™ F240 LF (wt % super add) | 6 | 6 | 6 | 6 | 6 |
| Liga (wt % super add) | — | — | — | — | — |
| Tall Oil (wt % super add) | — | — | — | — | — |
| Durasyn ® 162 (wt % super add) | 5 | 5 | 5 | 5 | 5 |
| Water (wt % super add) | 26 | 26 | 21 | 21 | 21 |
| Total heat treatment time (hours) | 2 | 2 | 2 | 4 | 2 |
| Top heat treatment temperature (° C.) | 1150 | 1100 | 1100 | 1100 | 1100 |
| CTE on heating from 25° C. to 800° C. ($\times 10^{-7}$/° C.) | 8.9 | 5.6 | 6.1 | 11.2 | 5.3 |
| CTE on heating from 25° C. to 200° C. ($\times 10^{-7}$/° C.) | 8.6 | 2.2 | 3.1 | 16.6 | 0.8 |
| MOR fired bars (psi) | 384 | 127 | 226 | 796 | 233 |
| MOR honeycomb (psi) | 1518 | 485 | 924 | 3012 | 1022 |
| Axial E-mod at 25° C. (psi × $10^5$) | NA | NA | 1.68 | 1.84 | 1.73 |
| Strain tolerance (%) | NA | NA | 0.13 | 0.43 | 0.13 |
| % Porosity (mercury porosimetry) | 44.5 | 47.3 | NA | 37.5 | 49.0 |
| Median pore size ($d_{50}$) | 2.54 | 1.13 | NA | 2.03 | 1.28 |
| Cells per square inch | 361 | 380 | 381 | 413 | 398 |
| Web thickness (mils) | 7.14 | 7.22 | 6.69 | 7.00 | 6.08 |
| Average channel width (inches) | 0.039 | 0.040 | 0.040 | 0.043 | 0.040 |
| Closed frontal area | 0.25 | 0.26 | 0.24 | 0.26 | 0.23 |

TABLE 5-continued

| Composition information and other characteristics | Example 50 | Example 51 | Example 52 | Example 53 | Example 54 |
|---|---|---|---|---|---|
| Dispal 15N4 (wt %) | 3.5 | 3.5 | 3.5 | 3.5 | 3.5 |
| Potassium feldspar G-200 HP (wt %) | 5.0 | 5.0 | 5.0 | 5.0 | 5.0 |
| Fused Silica, TecoSil GDP/44CSS (wt %) | 91.5 | 91.5 | 91.5 | 91.5 | 91.5 |
| Boric acid (wt %) | — | — | — | — | — |
| Pea starch (Esmland CL-9492) (wt % super add) | — | — | — | — | — |
| Potato starch (Esmland XL) (wt % super add) | — | — | — | — | — |
| Wheat starch (Fibersym) (wt % super add) | 20 | 20 | 20 | 20 | 20 |
| Corn starch (Emsland CL) (wt % super add) | — | — | — | — | — |
| Ashbury graphite (wt % super add) | — | — | — | 20 | 20 |
| Methocel ™ F240 LF (wt % super add) | 6 | 6 | 6 | 6 | 6 |
| Liga (wt % super add) | — | — | — | — | — |
| Tall Oil (wt % super add) | — | — | — | — | — |
| Durasyn ® 162 (wt % super add) | 5 | 5 | 5 | 5 | 5 |
| Water (wt % super add) | 21 | 21 | 21 | 21 | 21 |
| Total heat treatment time (hours) | 4 | 2 | 2 | 2 | 2 |
| Top heat treatment temperature (° C.) | 1100 | 1100 | 1100 | 1100 | 1100 |
| CTE on heating from 25° C. to 800° C. ($\times 10^{-7}$/° C.) | 13.0 | 6.1 | 6.1 | 8.3 | 7.7 |
| CTE on heating from 25° C. to 200° C. ($\times 10^{-7}$/° C.) | 22.4 | 1.9 | 2.7 | 8.7 | 6.6 |
| MOR fired bars (psi) | 454 | 182 | 198 | 261 | 295 |
| MOR honeycomb (psi) | 1680 | 794 | NA | 1121 | 1241 |
| Axial E-mod at 25° C. (psi × $10^5$) | 5.62 | 1.64 | 1.70 | 2.77 | 2.35 |
| Strain tolerance (%) | 0.08 | 0.11 | 0.12 | 0.09 | 0.13 |
| % Porosity (mercury porosimetry) | 37.7 | 47.2 | NA | 55.6 | NA |
| Median pore size ($d_{50}$) | 1.98 | 1.60 | NA | 2.72 | NA |
| Cells per square inch | 415 | 402 | NA | 424 | 387 |
| Web thickness (mils) | 7.15 | 6.08 | NA | 6.02 | 6.45 |
| Average channel width (inches) | 0.042 | 0.040 | NA | 0.040 | 0.040 |
| Closed frontal area | 0.27 | 0.23 | NA | 0.23 | 0.24 |

Table 6 shows compositions containing Tecosil fused silica, potassium feldspar, alumina, strontium oxide and some combinations with boron oxide and pore formers. Suitable combinations of physical properties are found in this system also. However, this system appears to be more sensitive to temperature where heat treatment at 1150° C. resulted in higher CTE.

TABLE 6

| Composition information and other characteristics | Example 55 | Example 56 | Example 57 | Example 58 | Example 59 |
|---|---|---|---|---|---|
| Dispal 15N4 (wt %) | 1.5 | 1.5 | 1.5 | 1.5 | 3.0 |
| Potassium feldspar G-200 HP (wt %) | 2.5 | 2.5 | 2.5 | 2.5 | 5.0 |

TABLE 6-continued

| | | | | | |
|---|---|---|---|---|---|
| Fused Silica, TecoSil GDP/44CSS (wt %) | 94.2 | 94.2 | 94.2 | 94.2 | 88.5 |
| Strontium carbonate (Type W) (wt %) | 1.8 | 1.8 | 1.8 | 1.8 | 3.5 |
| Boric acid (wt %) | — | — | — | — | — |
| Pea starch (Esmland CL-9492) (wt % super add) | — | — | — | — | — |
| Wheat starch (Fibersym) (wt % super add) | — | — | — | — | — |
| Methocel ™ F240 LF (wt % super add) | 6 | 6 | 6 | 6 | 6 |
| Liga (wt % super add) | 1 | 1 | 1 | — | — |
| Tall Oil (wt % super add) | — | — | — | — | — |
| Durasyn ® 162 (wt % super add) | — | — | — | 5 | 5 |
| Water (wt % super add) | 25 | 25 | 25 | 22 | 21 |
| Total heat treatment time (hours) | 4 | 4 | 4 | 4 | 2 |
| Top heat treatment temperature (° C.) | 1100 | 1150 | 1050 | 1100 | 1150 |
| CTE on heating from 25° C. to 800° C. ($\times 10^{-7}$/° C.) | 12.6 | 34.8 | 8.6 | 9.8 | 12.9 |
| CTE on heating from 25° C. to 200° C. ($\times 10^{-7}$/° C.) | 19.9 | 90.7 | NA | 14.4 | 23.0 |
| MOR fired bars (psi) | 726 | 916 | 241 | 311 | 695 |
| MOR honeycomb (psi) | 3197 | 3851 | 947 | 1442 | 3174 |
| Axial E-mod at 25° C. (psi × $10^5$) | 3.86 | 5.31 | 2.02 | 2.28 | 5.36 |
| Strain tolerance (%) | 0.19 | 0.17 | 0.12 | 0.14 | 0.13 |
| % Porosity (mercury porosimetry) | 30.9 | 26.7 | 35.9 | 34.7 | 28.8 |
| Median pore size ($d_{50}$) | 0.81 | 1.04 | 0.65 | 0.72 | 1.39 |
| Cells per square inch | 399 | 421 | 372 | 390 | 225 |
| Web thickness (mils) | 6.05 | 6.19 | 7.08 | 5.80 | 7.75 |
| Average channel width (inches) | 0.041 | 0.040 | 0.043 | 0.042 | 0.054 |
| Closed frontal area | 0.23 | 0.24 | 0.25 | 0.22 | 0.22 |

| Composition information and other characteristics | Example 60 | Example 61 | Example 62 | Example 63 | Example 64 |
|---|---|---|---|---|---|
| Dispal 15N4 (wt %) | 3.0 | 3.0 | 3.0 | 3.0 | 3.0 |
| Potassium feldspar G-200 HP (wt %) | 5.0 | 5.0 | 5.0 | 5.0 | 5.0 |
| Fused Silica, TecoSil GDP/44CSS (wt %) | 88.5 | 88.5 | 88.5 | 88.5 | 88.5 |
| Strontium carbonate (Type W) (wt %) | 3.5 | 3.5 | 3.5 | 3.5 | 3.5 |
| Boric acid (wt %) | — | — | — | — | — |
| Pea starch (Esmland CL-9492) (wt % super add) | — | — | — | 10 | 10 |
| Wheat starch (Fibersym) (wt % super add) | — | — | — | 10 | 10 |
| Methocel ™ F240 LF (wt % super add) | 6 | 6 | 6 | 6 | 6 |
| Liga (wt % super add) | — | — | — | — | — |
| Tall Oil (wt % super add) | — | 1 | 1 | 1 | 1 |
| Durasyn ® 162 (wt % super add) | 5 | — | — | — | — |
| Water (wt % super add) | 21 | 26 | 26 | 26 | 26 |
| Total heat treatment time (hours) | 4 | 4 | 4 | 4 | 4 |
| Top heat treatment temperature (° C.) | 1100 | 1100 | 1150 | 1150 | 1100 |

TABLE 6-continued

| | | | | | |
|---|---|---|---|---|---|
| CTE on heating from 25° C. to 800° C. (×10⁻⁷/° C.) | 12.0 | 12.7 | 33.2 | 29.7 | 12.2 |
| CTE on heating from 25° C. to 200° C. (×10⁻⁷/° C.) | 20.2 | 17.1 | 80.9 | 70.0 | 16.0 |
| MOR fired bars (psi) | 549 | 356 | 705 | 366 | 218 |
| MOR honeycomb (psi) | 2709 | 1552 | 2933 | 1646 | 938 |
| Axial E-mod at 25° C. (psi × 10⁵) | 3.34 | 2.60 | 3.93 | 2.32 | 1.64 |
| Strain tolerance (%) | 0.16 | 0.14 | 0.18 | 0.16 | 0.13 |
| % Porosity (mercury porosimetry) | 33.3 | 33.8 | 30.6 | 45.5 | 51.6 |
| Median pore size ($d_{50}$) | 1.00 | 0.75 | 1.25 | 4.98 | 3.21 |
| Cells per square inch | 223 | 388 | 396 | 404 | 387 |
| Web thickness (mils) | 7.17 | 6.20 | 6.46 | 5.88 | 6.31 |
| Average channel width (inches) | 0.056 | 0.041 | 0.041 | 0.040 | 0.041 |
| Closed frontal area | 0.20 | 0.23 | 0.24 | 0.22 | 0.23 |

| Composition information and other characteristics | Example 65 | Example 66 | Example 67 | Example 68 |
|---|---|---|---|---|
| Dispal 15N4 (wt %) | 1.5 | 1.5 | 1.5 | 1.5 |
| Potassium feldspar G-200 HP (wt %) | 2.5 | 2.5 | 2.5 | 2.5 |
| Fused Silica, TecoSil GDP/44CSS (wt %) | 94.2 | 94.2 | 96.0 | 96.0 |
| Strontium carbonate (Type W) (wt %) | 1.8 | 1.8 | — | — |
| Boric acid (wt %) | 2.0 | 2.0 | 2.0 | 2.0 |
| Pea starch (Esmland CL-9492) (wt % super add) | — | — | — | — |
| Wheat starch (Fibersym) (wt % super add) | — | — | — | — |
| Methocel ™ F240 LF (wt % super add) | 6 | 6 | 6 | 6 |
| Liga (wt % super add) | — | — | — | — |
| Tall Oil (wt % super add) | — | — | — | — |
| Durasyn ® 162 (wt % super add) | 5 | 5 | 5 | 5 |
| Water (wt % super add) | 21 | 21 | 21 | 21 |
| Total heat treatment time (hours) | 2 | 4 | 4 | 4 |
| Top heat treatment temperature (° C.) | 1150 | 1100 | 1150 | 1100 |
| CTE on heating from 25° C. to 800° C. (×10⁻⁷/° C.) | 100.7 | 10.7 | 26.1 | 48.0 |
| CTE on heating from 25° C. to 200° C. (×10⁻⁷/° C.) | 232.4 | 21.2 | 61.1 | 128.1 |
| MOR fired bars (psi) | 450 | 539 | 985 | 1012 |
| MOR honeycomb (psi) | 1529 | 2161 | 3943 | 4908 |
| Axial E-mod at 25° C. (psi × 10⁵) | 18.4 | 2.63 | 8.05 | 8.02 |
| Strain tolerance (%) | 0.02 | 0.20 | 0.12 | 0.13 |
| % Porosity (mercury porosimetry) | 35.1 | 35.0 | 23.9 | 29.1 |
| Median pore size ($d_{50}$) | 2.24 | 1.93 | 1.11 | 0.86 |
| Cells per square inch | 385 | 378 | 388 | 412 |
| Web thickness (mils) | 8.15 | 6.87 | 6.80 | 5.37 |
| Average channel width (inches) | 0.042 | 0.044 | 0.043 | 0.042 |
| Closed frontal area | 0.29 | 0.25 | 0.25 | 0.21 |

FIGS. 1A-C show SEM micrograph images of the two phase microstructure for cellular body samples with a cell density of about 600 cells per square inch and a wall thickness of about 100 microns prepared with the raw ingredients listed in Example 2 (Table 1), after sintering at temperatures of 1125, 1175, and 1225° C., respectively. The images were taken in backscatter mode, which provides for contrast based on average atomic number with high atomic number appearing as brighter than regions characterized by lower average atomic number. All three micrographs show the presence of a two-phase glass microstructure. The bright phase is the high-silica phase ("first phase"), and the darker phase is the borosilicate phase ("second phase"). Also seen in the micrographs in black are pores in the microstructure. The influence of heat treatment temperature is evident in the micrographs. As the heat treatment temperature increases, the porosity in the body decreases due to sintering. In addition, the volume of borosilicate phase increases as more silica is dissolved into the borosilicate phase at high temperatures. At the same time, the $B_2O_3$ content of this phase also decreases. The microstructures of the samples heat treated to 1125° and 1175° C. (FIGS. 1A and 1B, respectively) show relatively higher porosity (37% and 19% respectively), while the sample heat treated to 1225° C. (FIG. 1C) shows markedly decreased porosity (7.5%).

Figure 2:
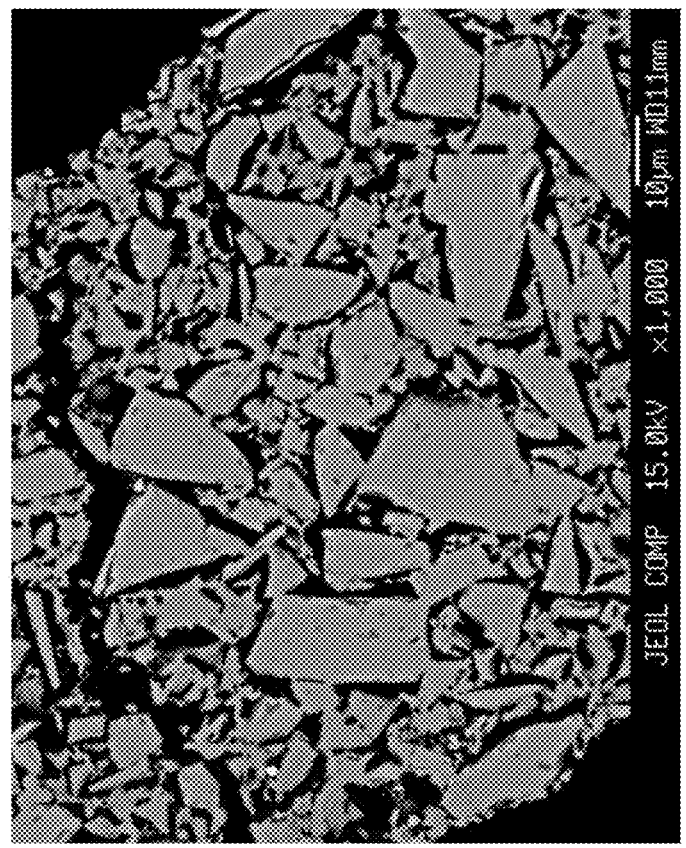
FIG. 2 shows an SEM micrograph image of a comparative sample.

FIG. 2 shows an SEM micrograph image from a comparative part extruded with 100% fused silica and heat treated to 1225° C. for 2 hours. Although the body still retains a large volume of porosity, the particles have not sintered sufficiently for development of high strength. Moreover, if this body is heat treated to higher temperatures to sinter the particle, the formation of cristobalite proceeds at an unacceptable rate and the thermal expansion coefficient becomes unacceptably high.

Figure 3:
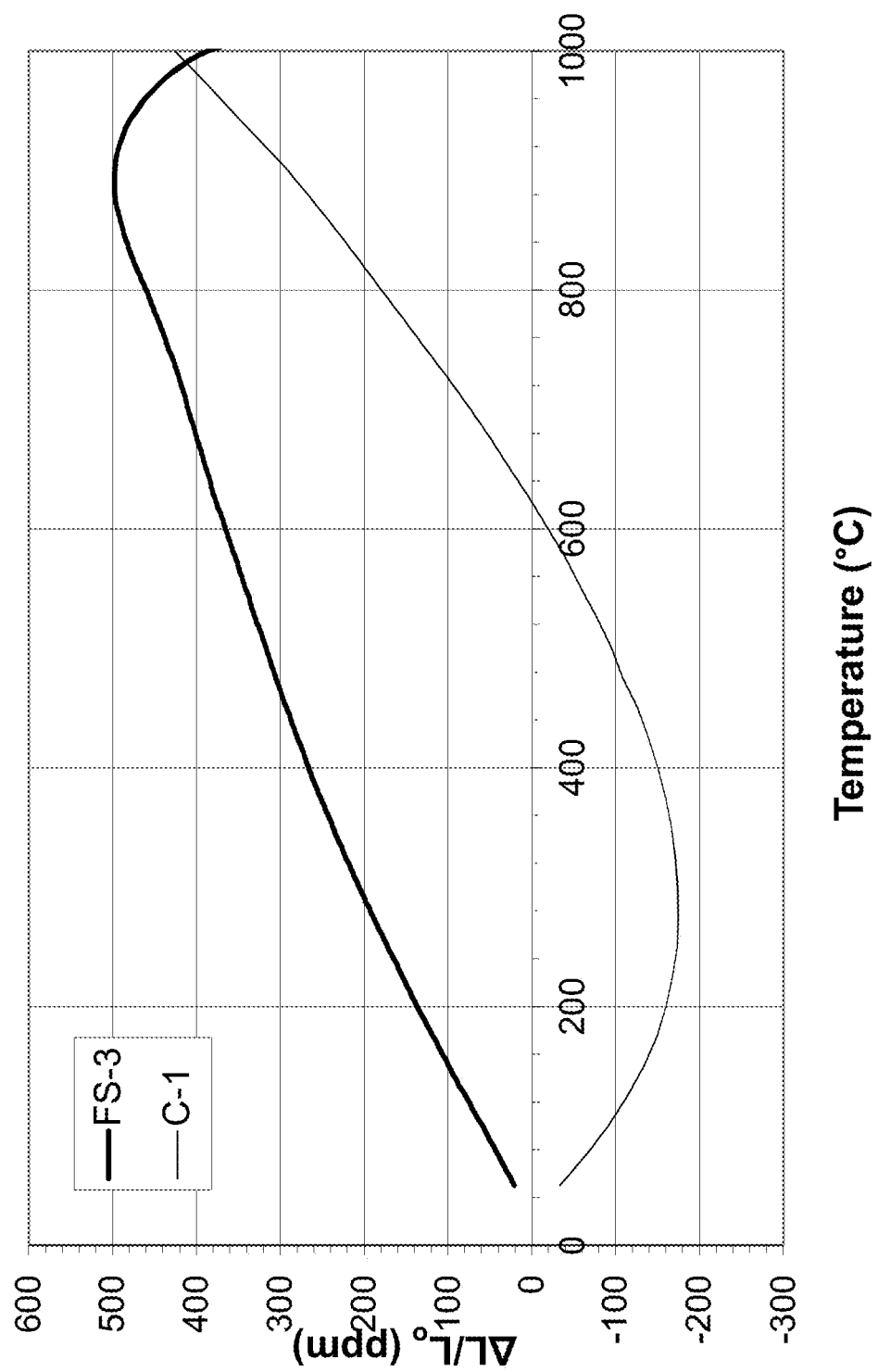
FIG. 3 plots thermal expansion on heating for a sample made according to embodiments disclosed herein and comparative samples.

FIG. 3 shows dilatometry curves showing dimensional change as a function of temperature for a sample having 94% by weight of Tecosil fused silica and 6% by weight of boric acid (FS-3) and cordierite (C-1) after sintering at 1225° C. for 2 hours and FS-3 after sintering at 1125° C. for 2 hours prior to dilatometric analysis.

Figure 4:
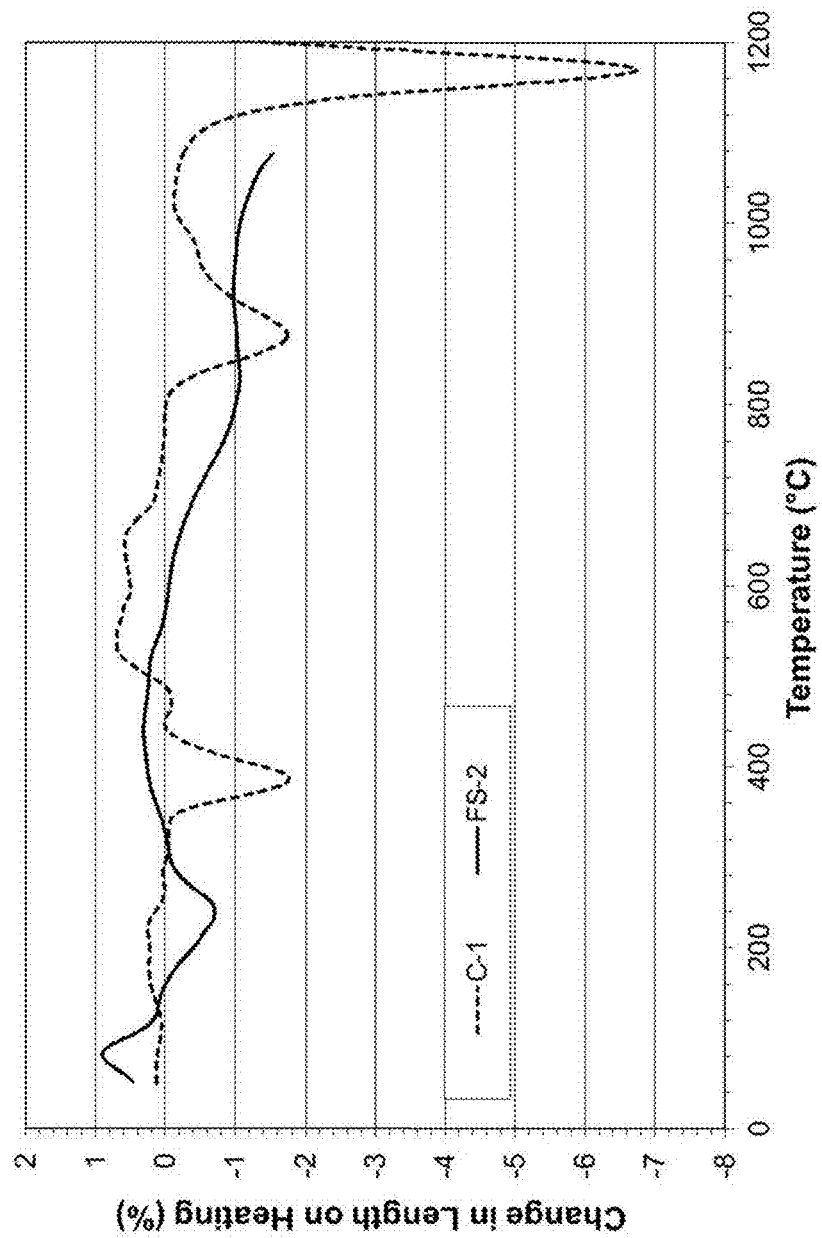
FIG. 4 plots dimensional change upon heating for a sample made according to embodiments disclosed herein and a comparative sample.

FIG. 4 is a plot of dimensional change versus temperature of two green ware specimens. The first is a sample of 94% Tecosil and 6% boric acid (FS-2), and the second is a sample of a cordierite precursor green cellular body (C-1). Both samples were extruded in the form of honeycomb to have cell density of about 600 cells per square inch and a wall thickness of about 100 microns. The specimens were heat treated in air at a heating rate of about 200° C. per hour. It can be seen from the figure that the magnitude of dimensional changes is less for the fused silica honeycomb than that for the ceramic honeycomb. In addition, the fused silica honeycomb lacks any sharp dimensional changes occurring over a relatively short temperature range. This feature is important in being able to fire the part on a fast firing cycle. Fast firing cycles result in temperature differentials in the part and if combined with periods of steep dimensional change, can result in stresses that will crack the part. Therefore, the fused silica honeycomb can be fired in a fraction of the time required for traditional ceramic honeycombs.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention as set forth in the appended claims. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. An exhaust aftertreatment component comprising:
a porous honeycomb body comprising a plurality of cells, where the porous honeycomb body comprises primarily a porous sintered glass material having a total porosity of at least 20%, the porous sintered glass material primarily comprising a first phase and a second phase,
wherein the first phase comprises at least 97% by weight of bonded amorphous silica particles and the second phase comprises at least 50% by weight of amorphous silica and at least 6% by weight of a sintering aid material, wherein the sintering aid material is a boron-containing compound, and
wherein the first phase and the second phase collectively comprise at least 85% by weight of amorphous silica; and
wherein the exhaust aftertreatment component comprises at least one of a particulate filter and a substrate for supporting a catalyst.

2. The exhaust aftertreatment component of claim 1, wherein the weight ratio of the first phase to the second phase is at least 1.5:1.

3. The exhaust aftertreatment component of claim 1, wherein the porous sintered glass material has a median pore diameter ($d_{50}$) of at least 0.5 microns.

4. The exhaust aftertreatment component of claim 1, wherein the porous cellular body has a CTE (25-800° C.) of less than $8.0 \times 10^{-7}$ /° C. and a modulus of rupture (MOR) of at least 1,000 psi.

5. The exhaust aftertreatment component of claim 1, wherein the porous sintered glass material comprises less than 0.1% by weight of $Na_2O$.

6. The exhaust aftertreatment component of claim 1, wherein the second phase contains at least 15% by weight of the sintering aid material.

7. The exhaust aftertreatment component of claim 1, wherein the second phase contains 10% to 25% by weight of the sintering aid material.

8. The exhaust aftertreatment component of claim 1, wherein the second phase comprises 50% to 92% by weight of amorphous silica.

9. The exhaust aftertreatment component of claim 1, wherein the second phase comprises at least 65% by weight of amorphous silica.

10. The exhaust aftertreatment component of claim 1, wherein the first phase comprises less than 3% by weight of sintering aid material.

11. An exhaust aftertreatment component made by a process comprising:
compounding a plurality of batch constituents to form a precursor batch composition, the batch constituents comprising amorphous fused silica powder and a sintering aid selected from the group consisting of $B_2O_3$ and $H_3BO_3$;
forming the precursor batch composition into a cellular green body comprising a porous honeycomb body comprising a plurality of cells; and
subjecting the cellular green body to a heat treatment to make a porous cellular body;
wherein the porous cellular body comprises primarily a porous sintered glass material comprising primarily a first phase and a second phase,
wherein the first phase comprises at least 97% by weight of amorphous silica and the second phase comprises at least 50% by weight of amorphous silica and at least 6% by weight of a sintering aid;

wherein the first phase and the second phase collectively comprise at least 85% by weight of amorphous silica;

wherein the porous sintered glass material has a total porosity of at least 20%; and wherein the exhaust aftertreatment component comprises at least one of a particulate filter and a substrate for supporting a catalyst.

12. The exhaust aftertreatment component of claim 11, wherein the porous sintered glass material has a median pore diameter ($d_{50}$) of at least 0.5 microns.

13. The exhaust aftertreatment component of claim 11, wherein the amorphous fused silica of the batch constituents has a median particle size of from 0.5 to 200 microns.

14. The exhaust aftertreatment component of claim 11, wherein the porous cellular body has a CTE (25-800° C.) of less than $8.0 \times 10^{-7}$/° C. and a modulus of rupture (MOR) of at least 1,000 psi.

15. The exhaust aftertreatment component of claim 11, wherein the heat treatment is a single heat treatment having a total duration of less than 20 hours.

16. The exhaust aftertreatment component of claim 11, wherein the second phase comprises 50% to 92% by weight of amorphous silica.

17. The exhaust aftertreatment component of claim 11, wherein the second phase comprises at least 65% by weight of amorphous silica.

* * * * *

UNITED STATES PATENT AND TRADEMARK OFFICE
CERTIFICATE OF CORRECTION

PATENT NO.         : 10,370,304 B2
APPLICATION NO.    : 14/073020
DATED              : August 6, 2019
INVENTOR(S)        : Douglas Munroe Beall et al.

Page 1 of 1

It is certified that error appears in the above-identified patent and that said Letters Patent is hereby corrected as shown below:

On page 2, Column 2, item (56), other publications, Lines 26-27, delete "Enginnering" and insert -- Engineering --, therefor.

On page 2, Column 2, item (56), other publications, Line 28, delete "Euorpean" and insert -- European --, therefor.

Signed and Sealed this
Seventeenth Day of March, 2020

Andrei Iancu
*Director of the United States Patent and Trademark Office*